Dec. 19, 1944.  W. H. DU BOIS  2,365,531
REGULATING VALVE
Filed Feb. 2, 1942   2 Sheets-Sheet 1
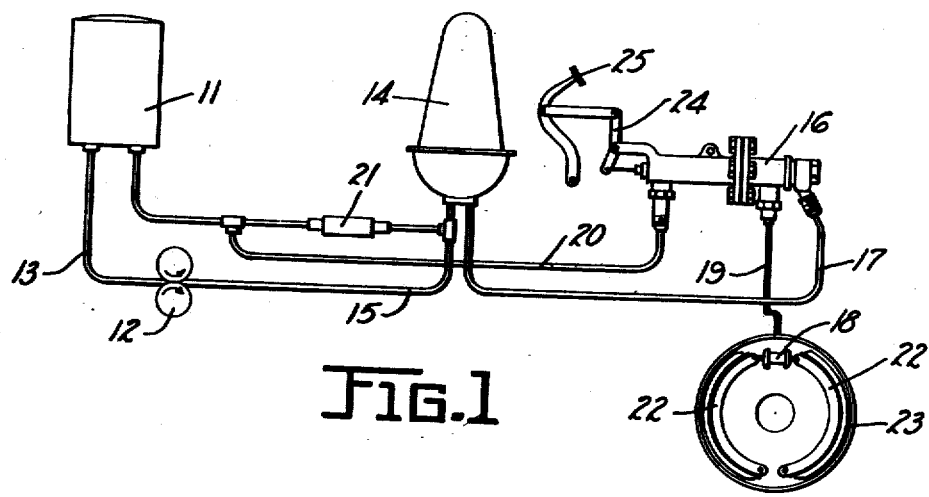
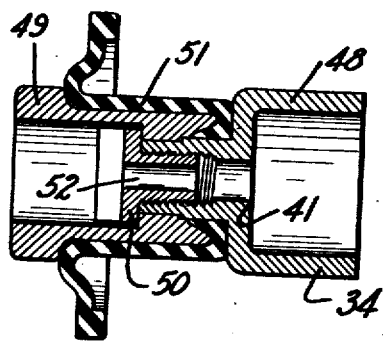
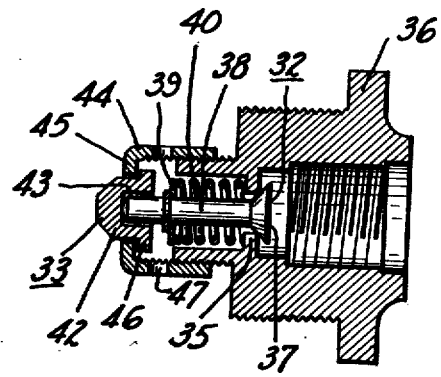
INVENTOR
WILLIAM H. DU BOIS
BY
ATTORNEY Dec. 19, 1944.     W. H. DU BOIS     2,365,531
REGULATING VALVE
Filed Feb. 2, 1942     2 Sheets-Sheet 2

INVENTOR
WILLIAM H. DU BOIS
BY
M. W. McConkey
ATTORNEY

Patented Dec. 19, 1944

2,365,531

UNITED STATES PATENT OFFICE 2,365,531

REGULATING VALVE

William H. Du Bois, South Bend, Ind., assignor to Bendix Aviation Corporation, South Bend, Ind., a corporation of Delaware Application February 2, 1942, Serial No. 429,147

5 Claims. (Cl. 303—54)

This invention relates to a regulating valve for operating a fluid pressure responsive motor by admitting fluid under pressure to said motor.

The object of this invention is to provide an improved regulating valve which will be useful in hydraulic or liquid pressure systems and which will have among others the following advantages: effective sealing of the elements which control the alternate connecting of the motor with an inlet or exhaust port; and elimination of substantially all friction from the moving parts of the regulating valve so that its operation will be highly sensitive and delicately controllable.

Other advantages and desirable features of this invention will become apparent during the course of the following description, reference being had therein to the accompanying drawings in which:

Fig. 1 is a diagrammatic showing of a fluid pressure system incorporating my improved regulating valve;

Figs. 3 and 4 are enlarged closeups of portions of Fig. 2.

Figure 2:
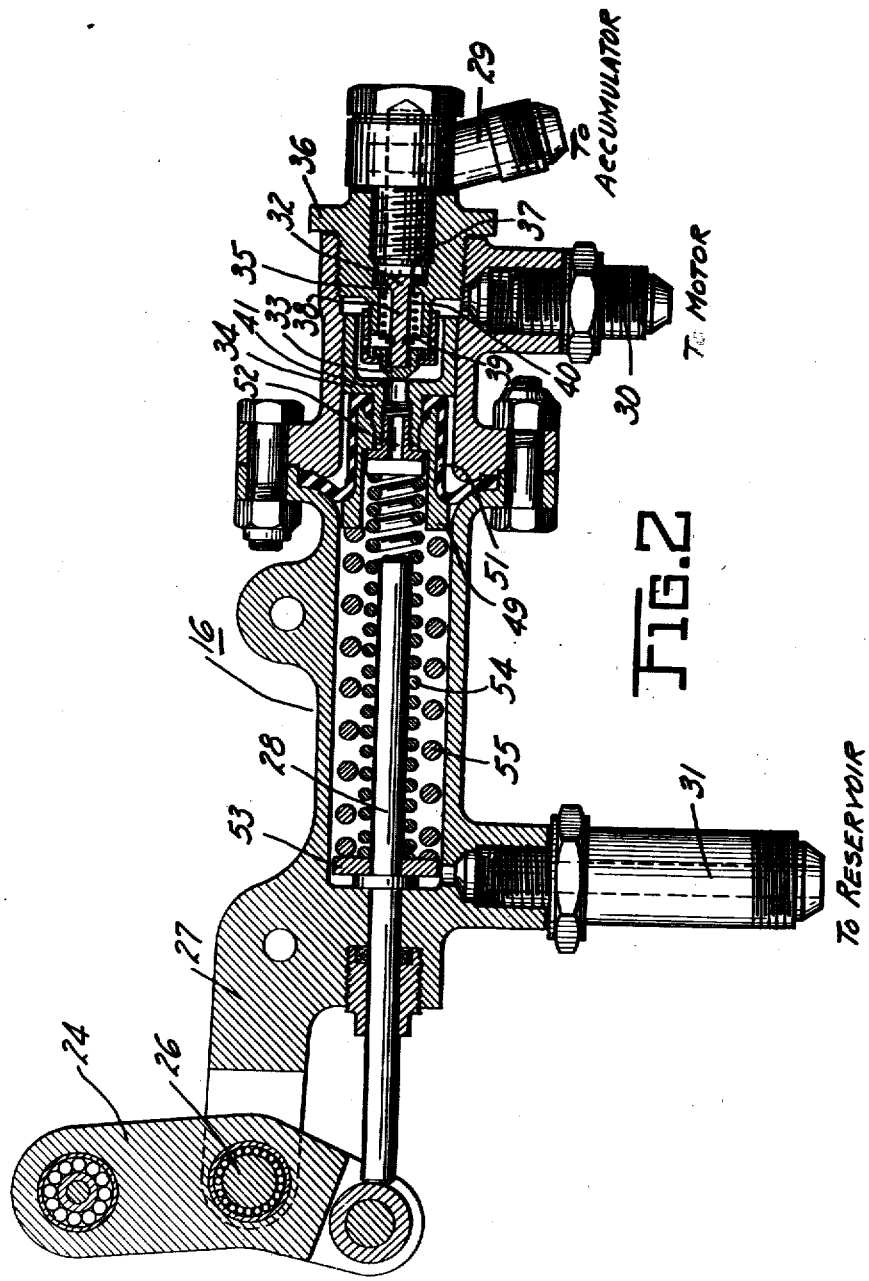
Fig. 2 is a vertical section taken through the said regulating valve.

A fluid pressure system utilizing my improved regulating valve may comprise, as shown in Fig. 1, a fluid reservoir 11, a pump 12, a conduit 13 connecting the reservoir to the pump, an accumulator 14 for storing fluid under pressure, a conduit 15 connecting the accumulator to the pump, a regulating valve 16, a conduit 17 connecting the regulating valve to the accumulator, a fluid pressure responsive motor 18, a conduit 19 connecting the motor 18 to the regulating valve, and a conduit 20 connecting the regulating valve to the reservoir. A pressure relief valve 21 may be connected between the accumulator and the reservoir to allow an escape of pressure fluid from the accumulator if the pressure builds up to a dangerously high point. The motor 18 is shown as being adapted to operate a brake by spreading a pair of brake shoes 22 against a brake drum 23. Obviously a fluid pressure responsive motor of any type might be utilized without departing from the scope of my invention and it might be utilized in accomplishing any function whatsoever, a brake being used in this instance for illustrative purposes only. Further, it should be pointed out that the regulating valve 16 will perform it desired function regardless of whether it is connected to an accumulator or is connected directly to a pump, it being immaterial whether the pressure fluid is stored prior to its use in operating the motor or whether the fluid is put under pressure simultaneously with its use in operating the motor.

As is well known in the art, in a fluid pressure system of the type shown in Fig. 1, the pump 12 draws fluid from the reservoir and forces it under pressure into the accumulator, and the fluid remains under pressure until the operator desires to use the pressure fluid in operating a motor. At that time, by actuating the regulating valve he may permit fluid under pressure to move from the accumulator to the motor and operate the motor. When operation of the motor is no longer desired, release of the regulating valve will allow fluid to return from the motor to the reservoir.

A lever 24 may be provided to operate the regulating valve 16, and this lever may either be operated by hand or may be connected to a foot pedal 25. The lever 24 is shown in Fig. 2 pivoted at 26 on an extension 27 protruding from the casing of the regulating valve 16. One end of the lever 24 is adapted to exert force against a push rod 28 which extends into the interior of the regulating valve 16 to set into motion the actuation thereof. The regulating valve has an inlet port 29 connected to the accumulator by conduit 17, an outlet port 30 connected to the motor 18 by conduit 19, and an exhaust port 31 connected to the reservoir by conduit 20. Control of communication between the several ports is accomplished conjointly by a valve 32, a valve 33, and a piston 34. The valve 32 controls communication between accumulator port 29 and motor port 30, said valve 32 comprising (refer to Fig. 4 for a clear disclosure) a valve seat 35 formed in a hollow insert 36 screwed into the end of the regulating valve, a valve head 37 adapted to seat at times at 35 and cut off communication between ports 29 and 30, a valve stem 38 secured to or integral with the valve head 37, an annular ring 39 secured to the stem 38, and a spring 40 compressed between the ring 39 and the valve seat 35 to urge the valve head 37 to seat at 35. The valve 33 comprises a valve seat 41 formed on the head of the piston 34, and a valve element 42 which at times seats at 41 to cut off communication between ports 30 and 31 and which is formed with a well or opening 43 (for clear disclosure see Fig. 4) into which extends the end of valve stem 38. An annular nut 44 screwed onto the inner end of the hollow insert 36 has a flange 45 which is adapted to at times contact a flange 46 on the valve element 42 to prevent the said valve element 42 from following up the piston when the piston moves toward released position. The annular nut 44 is also provided with a plurality of passages 47 to allow free communication between the interior of the hollow insert 36 and the outlet or motor port 30 whenever valve 32 is open. The piston 34 comprises (see Fig. 3) a head portion 48 the outer circumferential surface of which slidingly engages the inner wall of the valve 16, a skirt portion 49, and a bolt 50 which serves to clamp the head 48 and the skirt 49 together. A flexible annular diaphragm 51 has its inner circular edge clamped between the head and skirt of the piston and its outer edge clamped to the wall of the regulating valve 16. A passage 52 extends through the whole piston assembly 34 so that communication of fluid from motor port 30 to reservoir port 31 is freely allowed through the center of the said piston assembly 34 except when the valve 33 has seated at 41 on the piston head 48. Between a plate 53 movable with the manually operable rod 28 and the piston assembly 34 are compression springs 54 and 55. The spring 54 bears at one end against the plate 53 and at the other end against the bolt 50, while the spring 55 bears at one end against the plate 53 and at the other end against the skirt 49 of the piston.

Operation of my improved regulating valve is as follows. When the operator desires to actuate the brakes or other hydraulically controlled device, he causes the lever 24 to move in a counterclockwise direction about its pivot 26 forcing the rod 28 and plate 53 in a direction to compress the springs 54 and 55 and through the said springs exert force on the piston assembly 34 moving it toward the valves 33 and 32. Movement of the piston closes the valve 33 cutting off communication between motor port 30 and reservoir port 31 and subsequently movement of the piston by pushing the valve element 42 pushes the valve stem 38 and moves valve head 37 from its seat 35 allowing fluid under pressure from the accumulator to enter port 29 and, passing through port 30 to the hydraulic motor, cause operation of said motor. Fluid under pressure from the accumulator, simultaneously with operating the motor 18 exerts a reaction force against the manually operated lever 24 through the medium of the piston head 48. The pressure of the fluid exerted against said piston head 48 tends to move the piston against the pressure of the springs 44 and 45, and when the fluid pressure against the piston head is sufficient, the springs will be compressed sufficiently to allow the piston to move toward its released position and allow valve head 37 to seat at 35 and cut off the accumulator or source of fluid pressure from the motor. In this position, with both valves 32 and 33 closed, the regulating valve is in lapped position. The operator by exerting further manual pressure on the lever 24 and simultaneously moving said lever 24 in a counterclockwise direction may once again open valve 32 and increase the pressure which is operating motor 18 by allowing a further flow of pressure fluid from the source of pressure to the motor. Because of the compressibility of springs 54 and 55, the regulating valve may be said to be position sensitive. This is true inasmuch as the operator, in order to increase his manually applied force to thereby allow an increase in the pressure which is operating motor 18, must further compress the springs 54 and 55, and in order to do that, move the lever 24 further and further in a counterclockwise direction. When manual pressure on lever 24 is diminished or entirely eliminated, the force of pressure fluid from the pressure source will move the piston assembly 34 in a direction to first allow the valve 32 to close cutting off the flow of pressure fluid and to subsequently open the valve 33 allowing fluid from the motor to communicate with the reservoir and release the motor.

Because the pressure operating against the head 48 of the piston is likely to be quite high particularly in a fluid pressure system utilizing an accumulator for storing fluid under pressure there is a strong tendency for fluid to escape past the piston head 48 toward the reservoir port 31 and thus cause substantial loss of effective pressure in the system. Some form of seal must therefore be adopted to prevent the escape of fluid past the piston head. Use of a flexible sealing cup of the type generally known in the hydraulic art has been found to create a substantial amount of friction with the walls of the regulating valve. The effect of such friction is to diminish the sensitivity and controllability of the valve. My valve construction accomplishes effective sealing without causing hindering friction. The sealing is accomplished by diaphragm 51 which adequately prevents escape of fluid and does not interfere with free reciprocating movement of the piston assembly 34 inside the valve 16. Further effective sealing is accomplished by the utilization of poppet type valves 32 and 33 which are held on their respective seats, once they have seated, by the pressure of fluid in the accumulator or pressure source, with the result that an exceptionally effective seal is established and maintained between the various ports of the regulating valve. Particularly in cases where, for example, a brake is to be set for a considerable period of time it is desirable and even necessary to have almost perfect sealing in the regulating valve. Otherwise there will be a gradual leakage of pressure fluid until the pressure source is depleted and the brakes no longer remain applied. This consideration is particularly important in the case of airplanes inasmuch as they often remain stationary for long periods with the parking brakes applied and the supply pumps cut off. Another advantage of my device worthy of note is that the inlet valve 32 has been split from the exhaust valve 33 in the sense that the two valves are not rigidly connected. This allows the regulating valve to seek and find a balanced or lapped position with complete accuracy.

Although a single illustrative embodiment of my invention has been described, it is not my intention to limit the scope of my invention to that particular embodiment or otherwise than by the terms of the appended claims.

What I claim is:

1. For a hydraulic pressure system in which the operating liquid is placed under pressure by means other than manual means, a regulating valve comprising a valve body having a source of pressure port, a motor port and an exhaust port; a piston reciprocable in the valve body having a passage therethrough, and having a head surface subjected to the liquid pressure prevailing at the motor port; an annular flexible diaphragm secured to the piston and to the inner wall of the valve body; a compression spring bearing at one end against the piston on the side opposite the piston head surface; manually operable means for exerting force through the compression spring to move the piston; and an inlet and an outlet valve each comprising a floating poppet valve element and a valve seat which make contact with one another along a single circular line, the stem of each of the valve elements being provided with a radial clearance permitting the sealing portion of the valve element to accommodate itself to the valve seat and form a fluid tight seal, the outlet valve element being caused by initial movement of the piston to close the passage through the piston and thereby cut off communication between the motor and exhaust ports, and the inlet valve element being caused by subsequent movement of the piston to open communication between the source of pressure port and the motor port.

2. For a hydraulic pressure system in which the operating liquid is placed under pressure by means other than manual means, a regulating valve comprising a valve body having a source of pressure port, a motor port and an exhaust port; a piston reciprocable in the valve body having a passage therethrough, and having a head surface subjected to the liquid pressure prevailing at the motor port; an annular flexible diaphragm secured to the piston and to the inner wall of the valve body; manually operable means for exerting force to move the piston and for receiving the reaction from the liquid pressure acting on the piston head; and an inlet and an outlet valve each comprising a floating poppet valve element and a valve seat which make contact with one another along a single circular line, the stem of each of the valve elements being provided with a radial clearance permitting the sealing portion of the valve element to accommodate itself to the valve seat and form a fluid tight seal, the outlet valve element being caused by initial movement of the piston to close the passage through the piston and thereby cut off communication between the source of pressure port and outlet valve element when seated being held to its seat by the pressure of liquid which serves to operate the fluid pressure operable motor, and the inlet valve element being caused by subsequent movement of the piston to open communication between the source of pressure port and the motor port, said inlet valve element when seated being held to its seat by the pressure of liquid from the pressure liquid source.

3. For a hydraulic pressure system in which the operating liquid is placed under pressure by means other than manual means, a regulating valve comprising a valve body having a source of pressure port, a motor port and an exhaust port; a piston reciprocable in the valve body having a passage therethrough, and having a head surface subjected to the liquid pressure prevailing at the motor port; an annular flexible diaphragm secured to the piston and to the inner wall of the valve body and having a substantial portion thereof lying flat along the outer cylindrical surface of the piston, whereby movement of the piston moves the inner portion of the annular diaphragm longitudinally of the valve body without placing an appreciable tension on the diaphragm; a compression spring bearing at one end against the piston on the side opposite the piston head surface, said spring being fully extended when the piston is in released position; manually operable means for exerting force through the compression spring to move the piston; an inlet and an outlet valve each comprising a floating poppet valve element and a valve seat which make contact with one another along a single circular line, the outlet valve element being caused by initial movement of the piston to close the passage through the piston and thereby cut off communication between the motor and exhaust ports, and the inlet valve element being caused by subsequent movement of the piston to open communication between the source of pressure port and the motor port, said piston being substantially free to move from released position until it engages the outlet valve element; a relatively light spring biasing the inlet valve element toward closed position; and a retaining member secured to the valve body and having a flange thereon to limit movement of the outlet valve element in the direction of the piston, said retaining member also serving as a guide for said outlet valve element, said outlet valve element being provided with an opening therein into which is inserted the stem of the inlet valve element, whereby the inlet valve element is guided, said valve elements being slightly spaced from the respective guiding means, whereby the seating portions of the valve elements are permitted to accommodate themselves to the respective valve seats and form a fluid tight seal.

4. For a hydraulic pressure system in which the operating liquid is placed under pressure by means other than manual means, a regulating valve comprising a valve body having a source of pressure port, a motor port and an exhaust port; a piston reciprocable in the valve body having a passage therethrough, and having a head surface subjected to the liquid pressure prevailing at the motor port; an annular flexible diaphragm secured to the piston and to the inner wall of the valve body; a compression spring bearing at one end against the piston on the side opposite the piston head surface, said spring being fully extended when the piston is in released position; manually operable means for exerting force through the compression spring to move the piston; an inlet and an outlet valve each comprising a floating poppet valve element and a valve seat which make contact with one another along a single circular line, the outlet valve element being caused by initial movement of the piston to close the passage through the piston and thereby cut off communication between the motor and exhaust ports, and the inlet valve element being caused by subsequent movement of the piston to open communication between the source of pressure port and the motor port, said piston being substantially free to move from released position until it engages the outlet valve element; a relatively light spring biasing the inlet valve element toward closed position; and a member secured to the valve body and arranged to limit movement of the outlet valve element in the direction of the piston and to guide said outlet valve element, said outlet valve element being provided with an opening therein into which is inserted the stem of the inlet valve element, whereby the inlet valve element is guided, said valve elements being slightly spaced from the respective guiding means, whereby the seating portions of the valve elements are permitted to accommodate themselves to the respective valve seats and form a fluid tight seal.

5. For a hydraulic pressure system in which the operating liquid is placed under pressure by means other than manual means, a regulating valve comprising a valve body having a source of pressure port, a motor port and an exhaust port; a piston reciprocable in the valve body having a passage therethrough, and having a head surface subjected to the liquid pressure prevailing at the motor port; an annular flexible diaphragm secured to the piston and to the wall of the valve body; a compression spring bearing at one end against the piston on the side opposite the piston head surface, said spring being fully extended when the piston is in released position; manually operable means for exerting force through the compression spring to move the piston; an inlet and an outlet valve each comprising a floating poppet valve element and a valve seat which make contact with one another along a single circular line, the outlet valve element being caused by initial movement of the piston to close the passage through the piston and thereby cut off communication between the motor and exhaust ports, and the inlet valve element being caused by subsequent movement of the piston to open communication between the source of pressure port and the motor port, said piston being substantially free to move from released postion until it engages the outlet valve element; and means for limiting movement of the outlet valve element in the direction of the piston.

WILLIAM H. DU BOIS.

CERTIFICATE OF CORRECTION.

Patent No. 2,365,531.                                                    December 19, 1944.

WILLIAM H. DU BOIS.

It is hereby certified that error appears in the printed specification of the above numbered patent requiring correction as follows: Page 1, first column, line 49, for "it desired" read --its desired--; page 3, first column, line 35, claim 2, for "source of pressure port and" read --motor and exhaust ports, said--; and that the said Letters Patent should be read with this correction therein that the same may conform to the record of the case in the Patent Office.

Signed and sealed this 12th day of June, A. D. 1945.

(Seal)

Leslie Frazer
Acting Commissioner of Patents.

ing at one end against the piston on the side opposite the piston head surface, said spring being fully extended when the piston is in released position; manually operable means for exerting force through the compression spring to move the piston; an inlet and an outlet valve each comprising a floating poppet valve element and a valve seat which make contact with one another along a single circular line, the outlet valve element being caused by initial movement of the piston to close the passage through the piston and thereby cut off communication between the motor and exhaust ports, and the inlet valve element being caused by subsequent movement of the piston to open communication between the source of pressure port and the motor port, said piston being substantially free to move from released postion until it engages the outlet valve element; and means for limiting movement of the outlet valve element in the direction of the piston.

WILLIAM H. DU BOIS.

CERTIFICATE OF CORRECTION.

Patent No. 2,365,531.  December 19, 1944.

WILLIAM H. DU BOIS.

It is hereby certified that error appears in the printed specification of the above numbered patent requiring correction as follows: Page 1, first column, line 49, for "it desired" read --its desired--; page 3, first column, line 35, claim 2, for "source of pressure port and" read --motor and exhaust ports, said--; and that the said Letters Patent should be read with this correction therein that the same may conform to the record of the case in the Patent Office.

Signed and sealed this 12th day of June, A. D. 1945.

(Seal)

Leslie Frazer
Acting Commissioner of Patents.